(12) United States Patent
Prud'homme (10) Patent No.: US 9,170,035 B2
(45) Date of Patent: Oct. 27, 2015

(54) APPARATUS AND METHOD FOR THERMO-TRANSFORMATION OF WOOD

(75) Inventor: Guy Prud'homme, Mont-Royal (CA)

(73) Assignee: Airex Industries Inc., Laval, Quebec (CA)

( * ) Notice: Subject to any disclaimer, the term of this patent is extended or adjusted under 35 U.S.C. 154(b) by 908 days.

(21) Appl. No.: 13/305,727

(22) Filed: Nov. 28, 2011

(65) Prior Publication Data
US 2013/0137053 A1    May 30, 2013

(30) Foreign Application Priority Data
Nov. 7, 2011   (CA) .................................... 2757608

(51) Int. Cl.
| | | |
|---|---|---|
| *F26B 3/02* | (2006.01) | |
| *F24J 3/00* | (2006.01) | |
| *C10L 9/08* | (2006.01) | |
| *B27K 5/00* | (2006.01) | |

(52) U.S. Cl.
CPC ................ *F24J 3/00* (2013.01); *B27K 5/0005* (2013.01); *C10L 9/083* (2013.01)

(58) Field of Classification Search
CPC .............. F26B 3/00; F26B 3/02; F26B 19/00; F24J 3/00; B27K 5/005; C10L 9/00; C10L 9/003
USPC ........... 34/380, 381, 391, 396, 102, 201, 211, 34/212, 225; 432/1, 92
See application file for complete search history.

(56) References Cited

U.S. PATENT DOCUMENTS

| | | | | |
|---|---|---|---|---|
| 1,470,306 | A * | 10/1923 | Walsh ............................. | 34/403 |
| 1,509,849 | A * | 9/1924 | Thelen ............................. | 34/83 |
| 1,536,735 | A * | 5/1925 | Thelen ............................. | 34/489 |
| 1,774,208 | A * | 8/1930 | Mueller ............................. | 34/191 |
| 1,891,060 | A * | 12/1932 | Cobb ............................. | 34/191 |
| 2,081,098 | A * | 5/1937 | Steel ............................. | 34/191 |
| 2,085,634 | A * | 6/1937 | Cobb ............................. | 34/489 |
| 3,199,213 | A * | 8/1965 | Milligan et al. ................. | 34/396 |
| 3,343,276 | A * | 9/1967 | Blanshine et al. ............... | 34/216 |
| 3,453,743 | A * | 7/1969 | Hale ............................. | 34/639 |
| 3,548,513 | A * | 12/1970 | Taylor ............................. | 34/205 |
| 4,106,215 | A * | 8/1978 | Rosen ............................. | 34/217 |
| 5,557,858 | A * | 9/1996 | Macaluso et al. ............... | 34/273 |
| 5,836,086 | A * | 11/1998 | Elder ............................. | 34/396 |

(Continued)

FOREIGN PATENT DOCUMENTS

| | | | | |
|---|---|---|---|---|
| FR | 2581743 A1 | * | 11/1986 | ............. F26B 21/00 |
| GB | 1378191 A | * | 12/1974 | |
| JP | 2011094836 A | * | 5/2011 | |

*Primary Examiner* — Stephen M Gravini
(74) *Attorney, Agent, or Firm* — McDonnell Boehnen Hulbert & Berghoff LLP (57) ABSTRACT

An apparatus for thermo-transformation of wood planks comprises a chamber delimited by upright perforated walls, a top wall and end walls and having a closable entry for receiving wood planks into the chamber. A shell surrounds the chamber and is spaced therefrom to define a first vertical plenum with the first perforated wall, a second vertical plenum with the second perforated wall, and a horizontal plenum with the top wall. A ventilation system is in fluid communication with the plenums to produce a flow of heated air in the plenums. Vanes are actuatable to close/open access to the vertical plenums, to allow heated air into at least one of the vertical plenums, through the chamber via the perforated walls, and out from at least the other of the vertical plenums, to return to the ventilation system. A method for the thermo-transformation of wood is also provided.

19 Claims, 9 Drawing Sheets

(56) References Cited

U.S. PATENT DOCUMENTS

| | | | |
|---|---|---|---|
| 5,899,004 A * | 5/1999 | Sugaoka et al. | 34/396 |
| 5,979,074 A * | 11/1999 | Brunner et al. | 34/396 |
| RE36,728 E * | 6/2000 | Ishii | 34/396 |
| 6,467,190 B2 * | 10/2002 | Nagel et al. | 34/218 |
| 6,772,535 B2 * | 8/2004 | Koslow | 34/380 |
| 7,370,434 B2 * | 5/2008 | Duncan | 34/218 |
| 7,748,137 B2 * | 7/2010 | Wang | 34/396 |
| 7,997,003 B2 * | 8/2011 | Dotzler et al. | 34/60 |
| 8,667,703 B2 * | 3/2014 | McMahon et al. | 34/75 |
| 8,726,539 B2 * | 5/2014 | Potter et al. | 34/427 |
| 2007/0062059 A1 * | 3/2007 | Miller | 34/202 |
| 2011/0239861 A1 * | 10/2011 | Prud'homme | 95/107 |
| 2013/0137053 A1 * | 5/2013 | Prud'homme | 432/1 |
| 2013/0145646 A1 * | 6/2013 | Wolowiecki | 34/491 |
| 2013/0156845 A1 * | 6/2013 | Manoharan et al. | 424/450 |
| 2013/0205615 A1 * | 8/2013 | Prud'homme | 34/480 |

* cited by examiner

APPARATUS AND METHOD FOR THERMO-TRANSFORMATION OF WOOD

FIELD OF THE APPLICATION

The present patent application claims priority to Canadian Patent Application No. 2,757,608, filed on Nov. 7, 2011, which is incorporated herein by reference.

The present disclosure pertains to the thermo-transformation of wood, also referred to as torrefaction, and to equipment and a method used for the thermo-transformation of wood.

BACKGROUND OF THE ART

The process of wood torrefaction or thermo-transformation removes a major portion of the internal moisture of wood, rendering the torrefied wood resistant to bio-degradation, insect damage, and rotting. Torrefied wood will not shrink, swell or warp with changing weather and moisture conditions. Accordingly, torrefied wood is a durable material and is hence well suited for outdoor applications, among numerous possible uses.

Moreover, as no chemicals are used in the torrefaction of wood, the wood keeps a natural appearance. In torrefying wood, the wood is subjected to high temperatures in an oven. However, one of the issues is the non-uniform coloring of the wood due to the torrefying process. Because of some variations in conditions in the torrefying oven, some planks may come out with different colors than other planks. Therefore, it is desirable to provide a thermo-transformation apparatus, system and/or method that perform generally uniform torrefying conditions.

SUMMARY OF THE APPLICATION

It is therefore an aim of the present disclosure to provide an apparatus and system for the thermo-transformation of wood, that addresses issues associated with the prior art.

Therefore, in accordance with the present application, there is provided an apparatus for thermo-transformation of wood planks, comprising: a chamber delimited by a first upright perforated wall, a second upright perforated wall, a top wall and end walls and having a closable entry for receiving wood planks into the chamber; a shell surrounding the chamber and spaced therefrom to define a first vertical plenum with the first perforated wall, and a second vertical plenum with the second perforated wall, and a horizontal plenum with the top wall; a ventilation system in fluid communication with the plenums to produce a flow of heated air in the plenums; and vanes in the plenums being actuatable to close/open access to the vertical plenums, to allow heated air into at least one of the vertical plenums, through the chamber via the perforated walls, and out from at least the other of the vertical plenums, to return to the ventilation system.

Further in accordance with the present application, there is provided a method for performing a thermo-transformation treatment on wood planks, comprising: heating air and directing the heated air to a first vertical plenum; directing the heated air from the first vertical plenum transversely through a bundle of spaced-apart planks oriented lengthwise by way of a first perforated wall; and collecting the heated air in a second vertical plenum and directing the collected air to be reheated.

DESCRIPTION OF THE PREFERRED EMBODIMENTS

Figure 1:
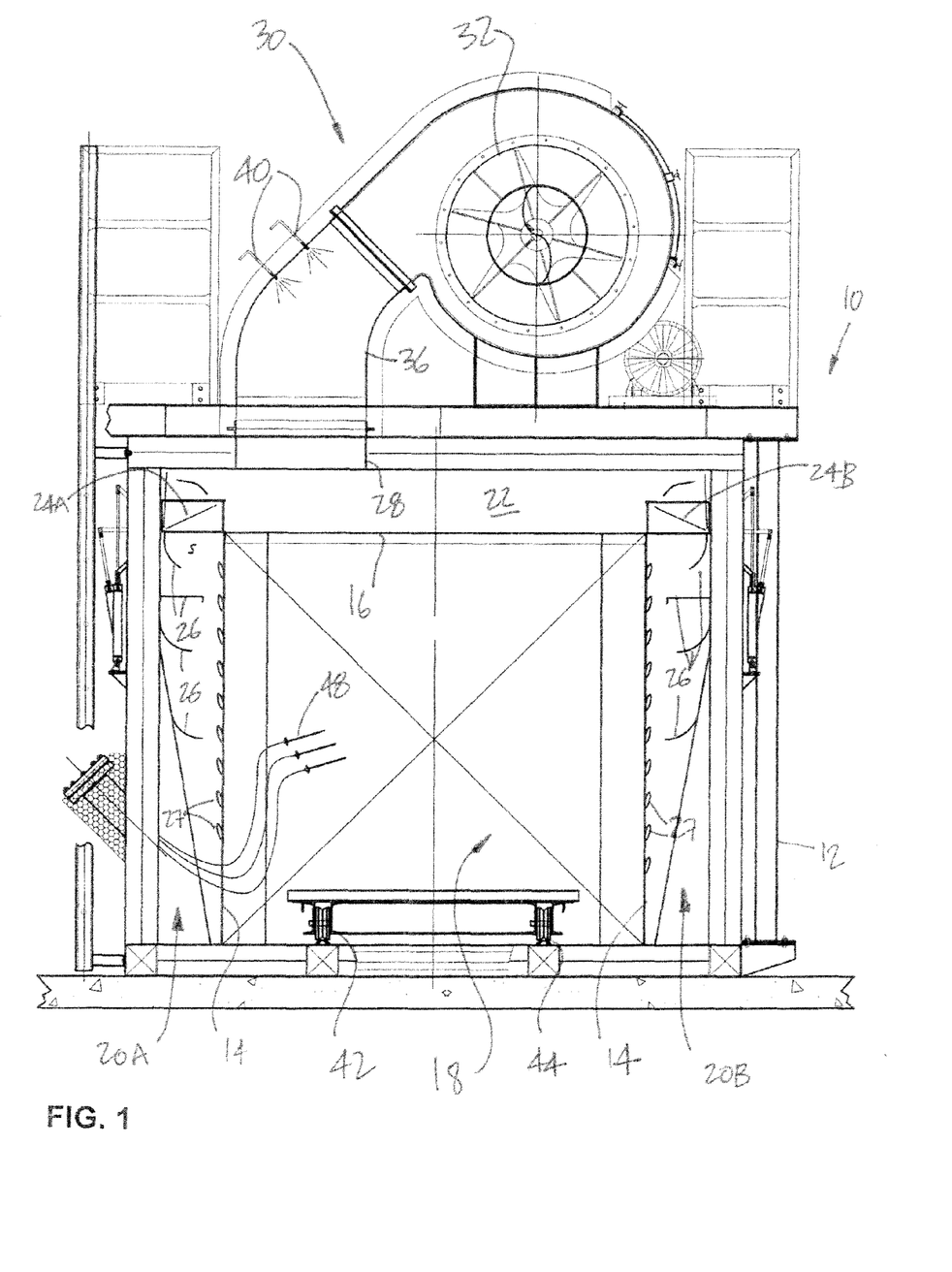
FIG. 1 is a front sectional view of an apparatus for the thermo-transformation of wood in accordance with an embodiment of the present disclosure.

Referring to the drawings and more particularly to FIG. 1, there is illustrated an apparatus for the thermo-transformation of wood. The thermo-transformation process is also referred to as torrefaction of wood.

The apparatus 10 has a structural casing 12 in which the thermo-transformation process takes place. The structural casing 12 therefore has a door 13 to access an interior thereof. The configuration of the structural casing 12 is designed so as to maintain relatively stable conditions in an interior thereof and will be described in further detail hereinafter.

Figure 3:
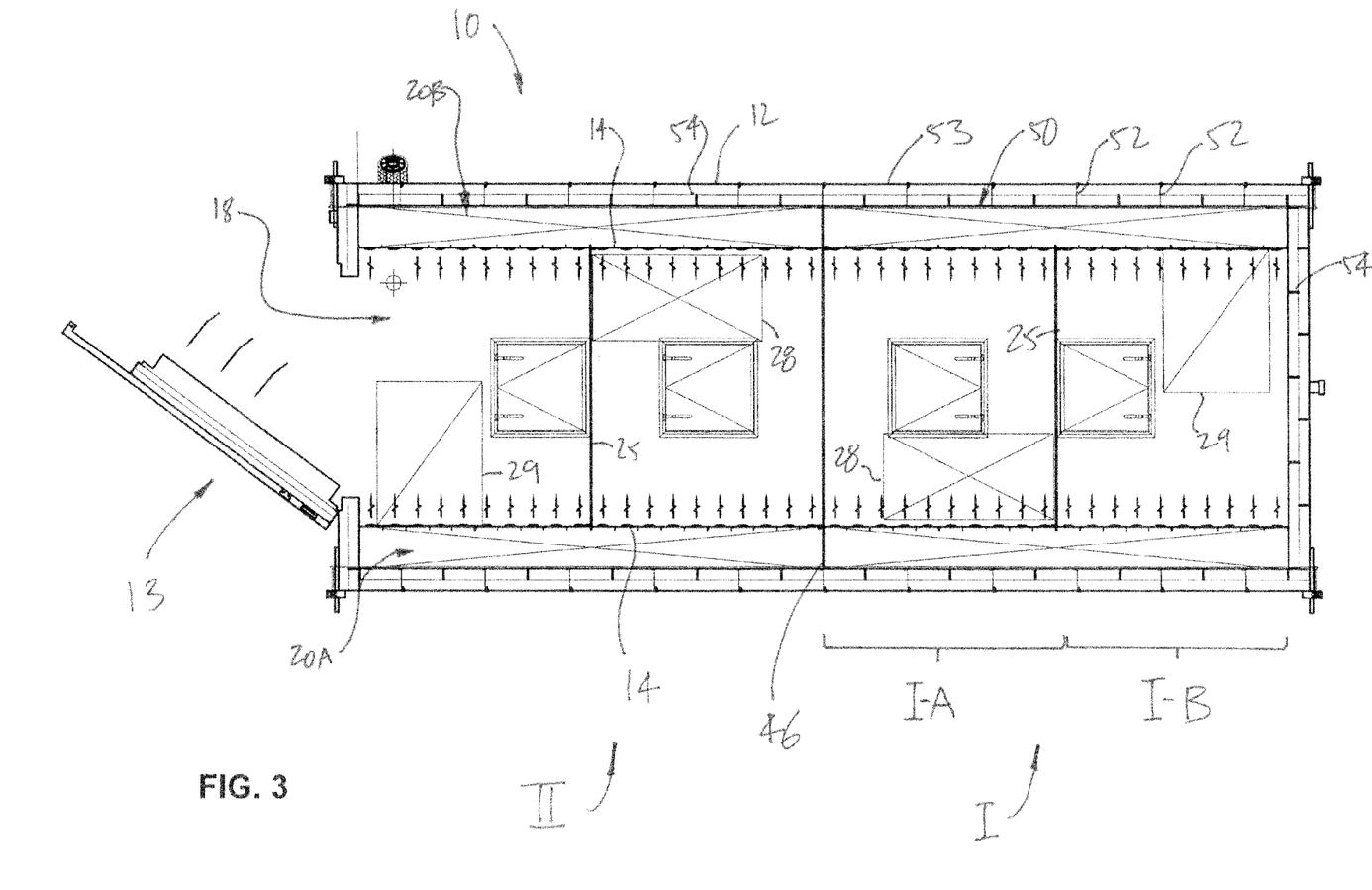
FIG. 3 is a top plan section view of the apparatus of FIG. 1.

Referring to FIGS. 1 and 3 concurrently, perforated walls 14 are generally upstanding in an interior of the apparatus 10. A top wall 16 is positioned atop the perforated walls 14 so as to define a thermo-transformation chamber 18 in which wooden planks are inserted and accommodated during the thermo-transformation process.

It is observed that the perforated walls 14 are spaced apart from the structural casing 12, thereby defining vertical plenums 20A and 20B. The perforated walls 14 are upright, namely they are generally vertical (more or less 90 degrees from the ground, with variations possible). The vertical plenums 20A and 20B extend the full length of the apparatus 10 and are on both sides of the thermo-transformation chamber 18. As seen in FIG. 1, a horizontal plenum 22 is defined between the structural casing 12 and the top wall 16. Accordingly, air may circulate between the horizontal plenum 22 and the vertical plenums 20A and 20B.

Vanes 24A and 24B are respectively positioned at the junction between the vertical plenums 20A and 20B and the horizontal plenum 22. The vanes 24A and 24B are automatically actuated so as to control an amount of air that passes from the horizontal plenum 22 to the vertical plenums 20A and 20B. Referring to FIG. 3, partition walls 25 are located in the horizontal plenum 22 to segment the horizontal plenum 22 in two subsections, namely subsections I-A and I-B in FIG. 3. Each of the subsections I-A and I-B has its own set of vanes 24A and 24B (or multiple vanes 24A and 24B). The partition walls 25 lie in a plane this is normal to a longitudinal dimension of the casing 12.

Referring to FIG. 1, baffle plates 26 are within the vertical plenums 20A and 20B. The baffle plates 26 are arranged so as to cause a generally uniform amount of air to pass through the openings in the perforated walls 14. The perforated walls 14 have throttle disks 27 for each of their openings. The throttle disks 27 are adjustable manually to increase or lessen the entry of the openings, prior to the use of the apparatus 10.

As observed from FIG. 3, the horizontal plenum 22 is accessed via an inlet 28 and an outlet 29. The inlet 28 receives heated air while the outlet 29 is for the exhaust of the air after it has circulated through a plank bundle, as part of the thermo-transformation process. Accordingly, ventilation units 30 are provided and positioned between the inlet 28 and the outlet 29 to cause a convection flow of the air within the thermo-transformation chamber 18.

Figure 4:
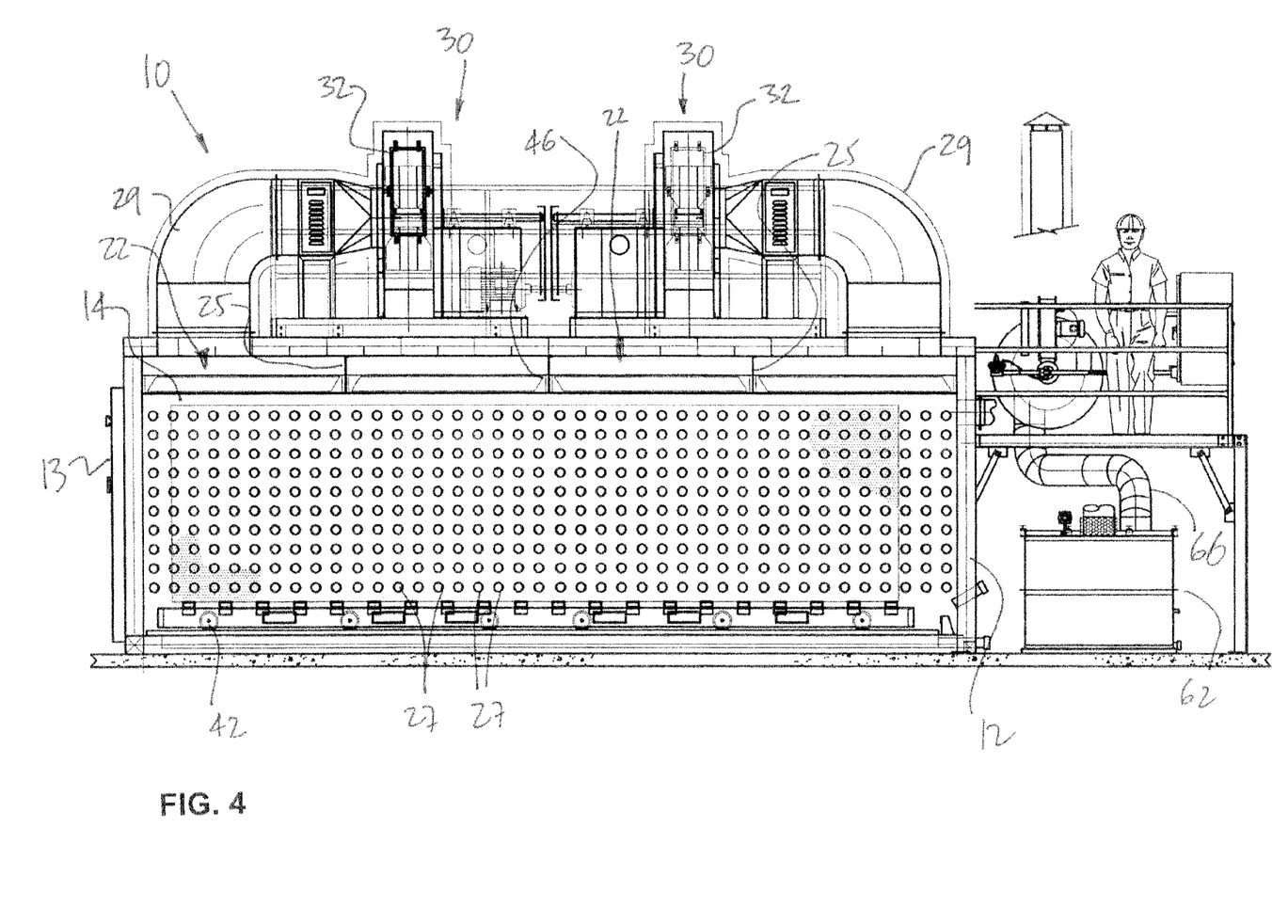
FIG. 4 is a longitudinal sectional view of the apparatus of FIG. 1.
Figure 5:
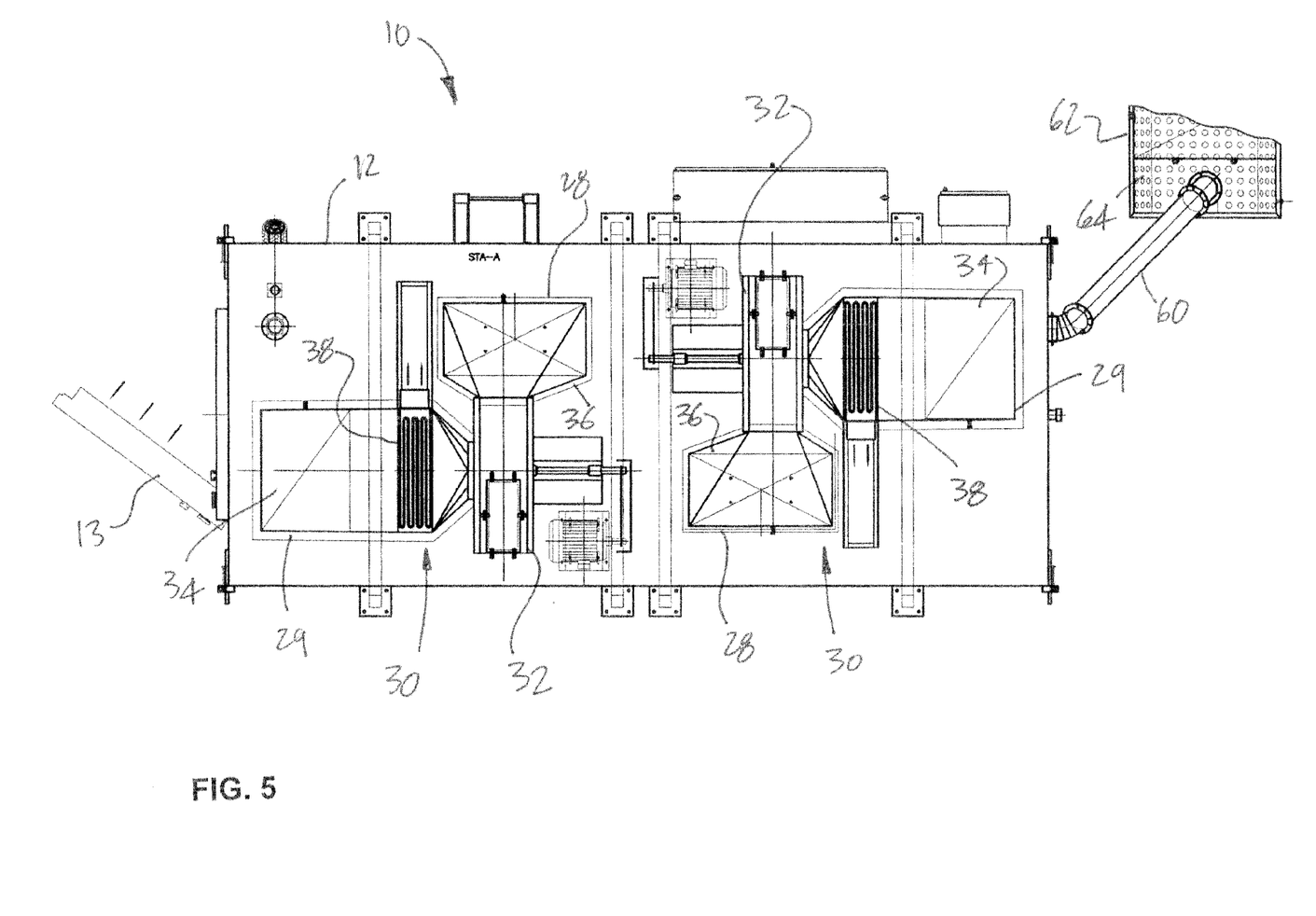
FIG. 5 is a top plan view of the apparatus of FIG. 1, showing ventilation units.

Referring to FIGS. 1, 4 and 5, the ventilation units 30 are shown as having a fan 32. A suction duct 34 relates the outlet 29 to the fan 32 while a feed duct 36 relates the fan 32 to the inlet 28. A heating element 38 is within either one of the suction duct 34 and feed duct 36 but preferably after the fan 32. Moreover, humidifying nozzles 40 may be provided to adjust the humidity level in the air that is being fed to the thermo-transformation chamber 18.

The thermo-transformation chamber 18 has an elongated shape to receive bundles of planks lengthwise. The elongated shape is particularly important in ensuring generally uniform torrefaction conditions. In an embodiment, the thermo-transformation chamber is at least 5'0" large, for a 7'0" height and 22'0" length (effective dimensions). Therefore, the length to width ratio is high (at least 4.0), as opposed to existing torrefaction equipment.

Now that the apparatus 10 has been structurally described, the thermo-transformation of wood therein is now set forth. Planks are mounted on trolley 42 (i.e., buggy, carriage, etc.) as shown in FIG. 1. The trolley 42 may be mounted on rails 44 extending from an exterior to an interior of the thermo-transformation chamber 18. The planks are mounted onto the trolley 42 so as to be spaced apart from one another and therefore have all surfaces exposed during the thermo-transformation process. The planks of the bundle are arranged so as to be oriented lengthwise in chamber 18. Provided the chamber 18 has an appropriate length, bundles may be put end to end. The length-to-width ratio of the chamber 18 is well suited for receiving the planks lengthwise. The planks are separated from one another by spacers, such that air may circulate between planks.

It is observed from FIG. 3 that the thermo-transformation apparatus 10 is separated in two sections by separator wall 46. A first section I is a mirror image of second section II. For simplicity purposes, the flow of air in a single one of the sections I and II will be described, but the operation of the thermo-transformation process is similar for the sections I and II.

The vane 24A of subsection I-A of the partition walls 25 is opened while the vane 24B of the subsection I-A are closed. Simultaneously, the vane 24B of the subsection I-B (i.e., the side of the partition wall 25 incorporating the outlet 29) is opened while the vane 24A of the subsection I-B is closed. Therefore, with this arrangement of closed and opened vanes 24A and 24B, the hot and humidified air entering via the inlet 28 will be directed into the vertical plenum 20A of subsection I-A. This treatment air will be directed to the thermo-transformation chamber 18 by the baffle plates 26 and throttle disks 27 in such a way that the air will be generally uniformly distributed along the perforated walls 14 such that a generally equivalent amount of treatment air with generally uniform conditions reaches all foreground planks. The flow of air is thus generally perpendicular to the length of the planks in the bundles, by the arrangement of perforated walls 14 in the vertical plenums 20A and 20B.

A vacuuming effect will induce a flow of the treatment air through the planks and to the vertical plenum 20B of the subsection I-B. The treatment air will then be exhausted by the ventilation unit 30 to then be reheated and rehumidified. Therefore, a loop of treatment air is induced.

After a predetermined amount of time, the vanes are reversed such that treatment air reaching the horizontal plenum 22 of the subsection I-A will firstly pass through the vertical plenum 20B of the subsection I-A, to then exit via the vertical plenum 20A of subsection I-B. Again, the flow of air will be generally perpendicular to the length of the planks in the bundles. The air will subsequently be exhausted via the outlet 29 to be treated by the ventilation unit 30.

Accordingly, the conditions to which all planks in the thermo-transformation chamber 18 will be subjected to are generally uniform. As mentioned previously, a similar air flow is induced in the section II of the apparatus 10.

The operation of the vanes to control the air flow in the chamber 18 may be performed as a function of parameters monitored throughout the thermo-transformation. For instance, as shown in FIG. 1, probes 48 (e.g., thermocouples, manometers, etc.). The parameters are collected by a processing unit or like controller means that will provide information required to control the vanes, and control the actuation of the vanes.

Figure 2:
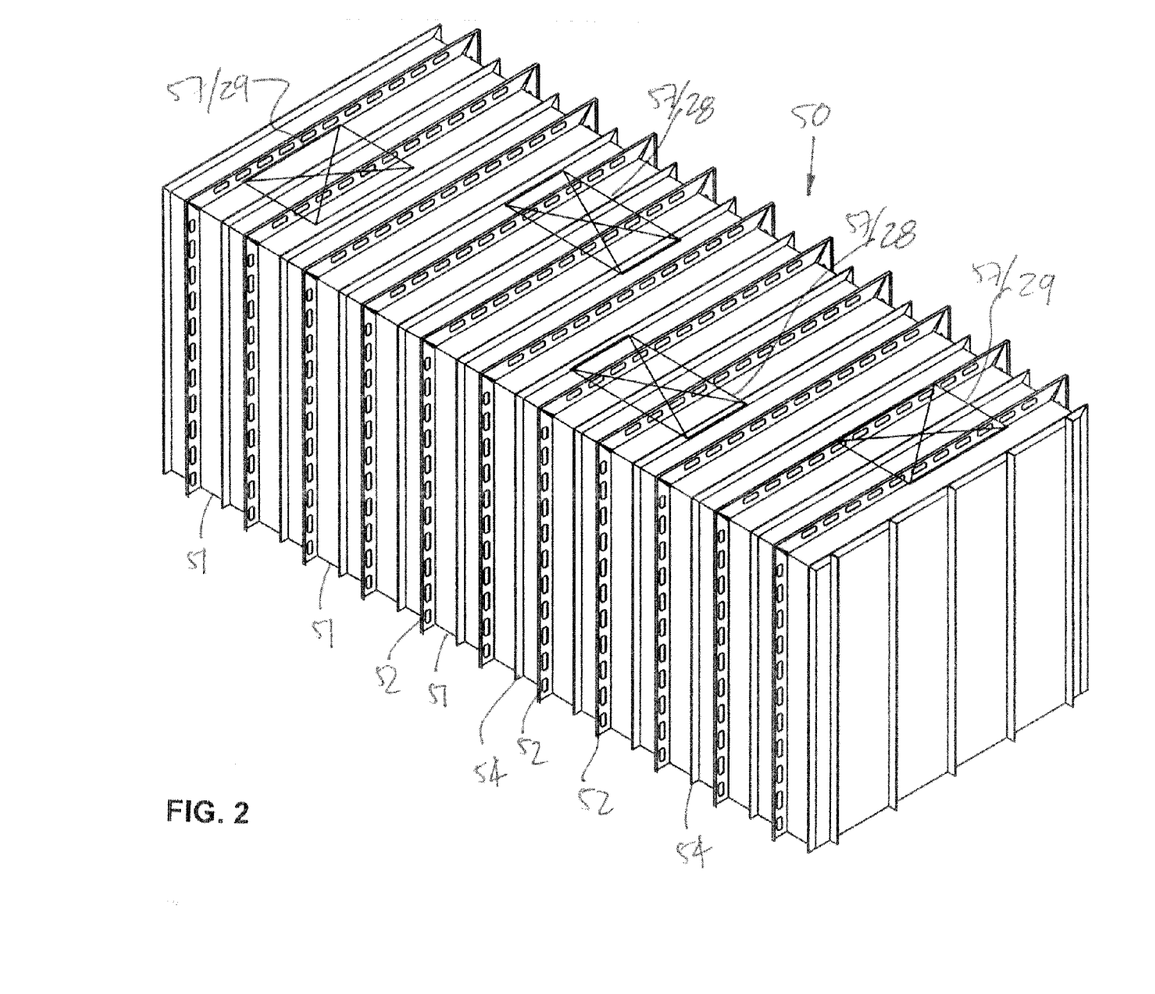
FIG. 2 is a perspective view of an expandable shell of the apparatus of FIG. 1.

Referring to FIGS. 2 and 3, an expandable shell 50 of the structural casing 12 is illustrated. The expandable shell 50 is designed to expand as a function of the temperature in the chamber 18, in order to maintain relatively stable conditions therein. The expandable shell 50 consists of wall segments 51 interconnected by flanges 52 to form an accordion-like casing. The flanges 52 are longitudinally distributed on the shell 50.

As seen in FIGS. 2 and 3, the flanges 52 have a Z-profile, and are attached to lateral walls 53 of the structural casing 12. According to an embodiment, the flanges 52 are bolted to the lateral walls 53. Therefore, the flanges 52 are made of a relatively thin metal, such as bent sheet metal, whereby they form a joint between the lateral walls 53 and the expandable shell 50. The joint is essentially equivalent to a pair of hinges.

Ribs 54 may also be provided between the flanges 52 on the wall segments 51, on an end wall 55 of the expandable shell 50, and/or on an end wall 56 of the structural casing 12. Accordingly, the ribs 54 will limit the expansion of the expandable shell 50 by abutting against the structural casing 12, whereby the expandable shell 50 will maintain a generally uniform shape when expanding. Moreover, the ribs 54 may be used to maintain insulation material in place. Other configurations are also considered to allow a controlled expansion of the shell 50.

As observed in FIG. 2, the expandable shell 50 has openings 57 for connection with the ventilation units 30. Due to the expanding nature of the expandable shell 50, the ventilation units 30 may be connected to the expandable shell 50 by way of flexible insulated ducts.

Figure 6:
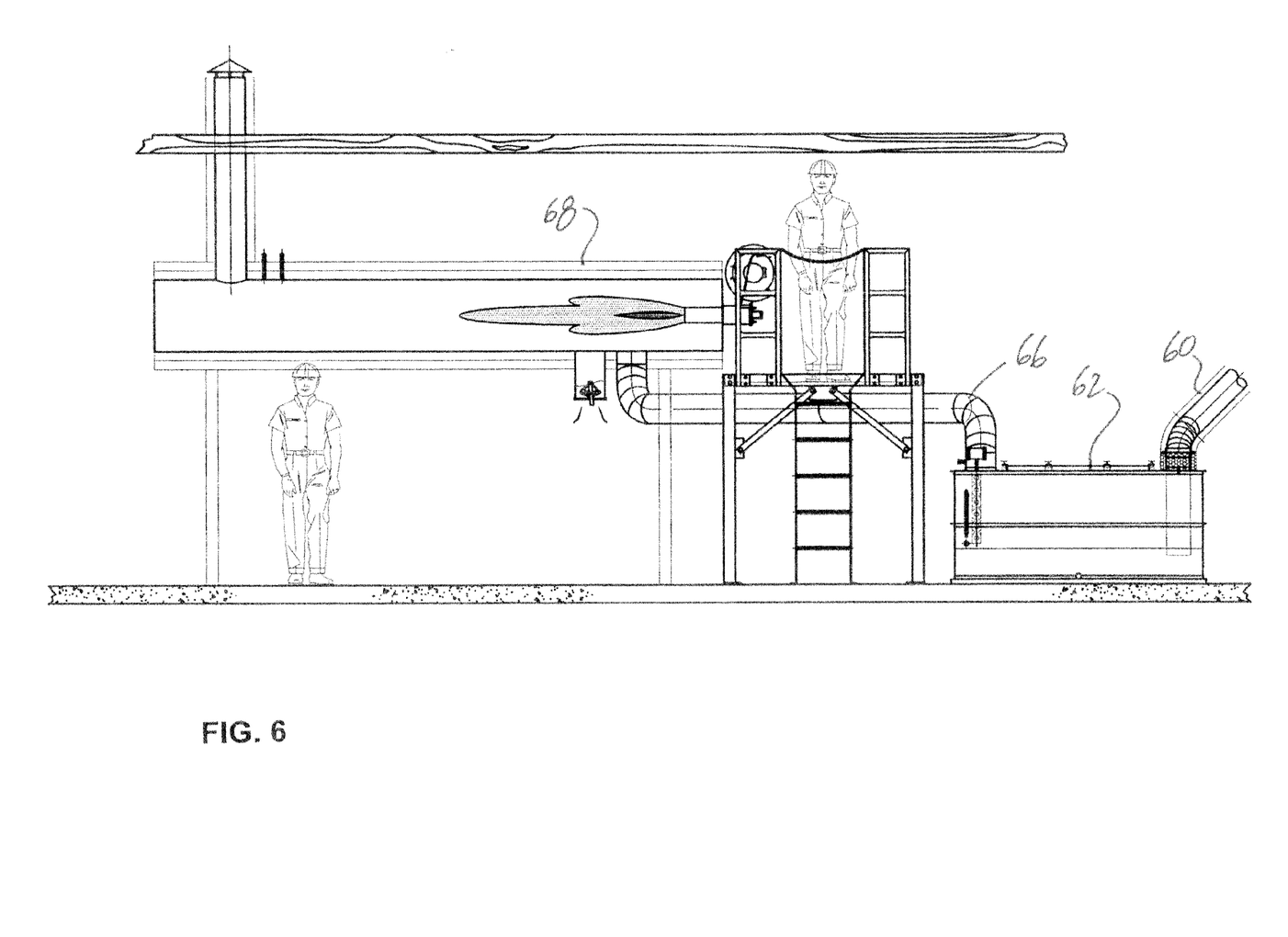
FIG. 6 is a schematic view of a separator basin and burner used with the apparatus of FIG. 1.
Figure 7:
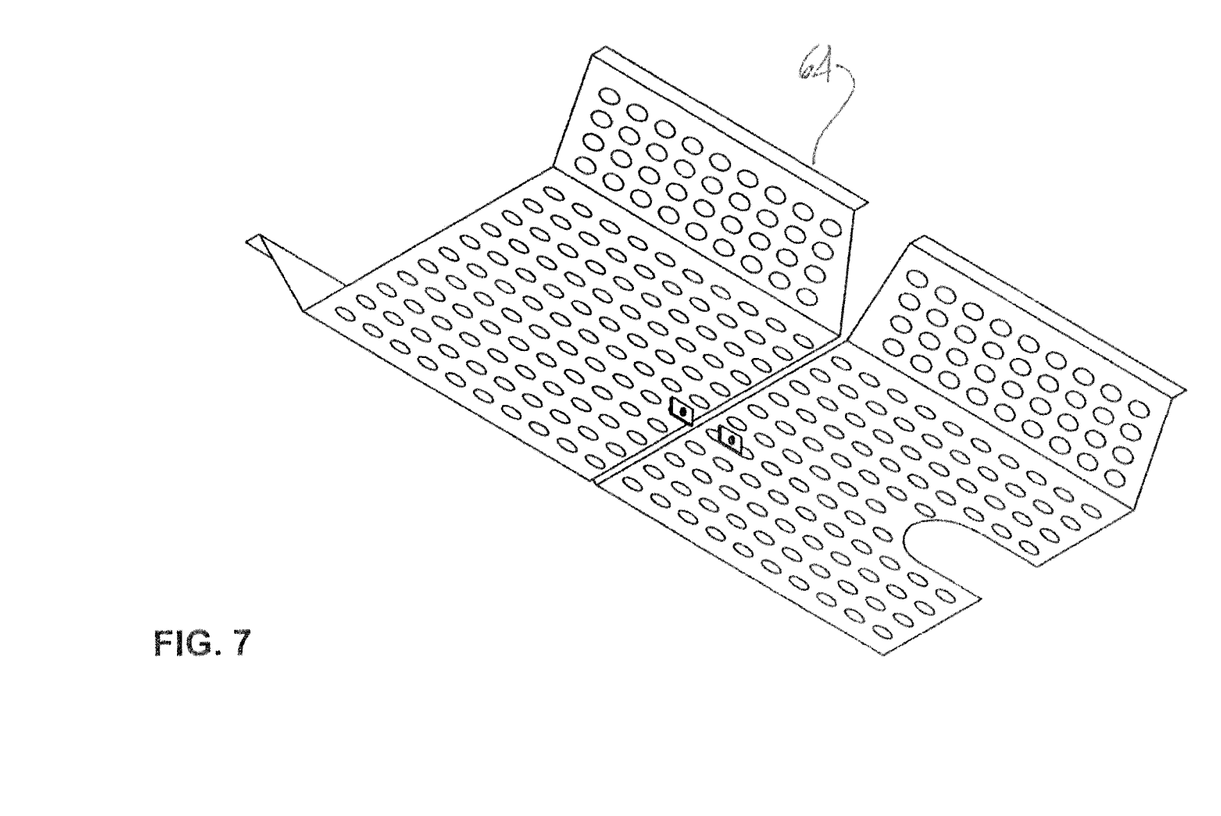
FIG. 7 is a perspective view of a perforated panel of the separator basin of FIG. 6.

Referring to FIG. 5, an exhaust pipe 60 is shown in fluid communication between the apparatus 10 and a separator basin 62. The separator basin 62 is used to remove any solid particles from the thermo-transformation air. More specifically, it is anticipated that the thermo-transformation process will create residue in the air such as airborne solids and volatile organic compounds (i.e., polluted air). Referring to FIGS. 5 to 7, the separator basin 62 has a casing in which a pool of liquid such as water is held. As shown in FIG. 6, the exhaust pipe 60 extends into the pool of liquid, whereby the polluted air reaching the separator basin 62 will pass through the liquid. Therefore, the solids will be retained by the liquid of the separator basin 62.

Referring to FIGS. 5 and 7, a perforated panel 64 is shown and is positioned inside the separator basin 62 to stabilise the pool of liquid despite the fact that hot gas is blown into the liquid. Accordingly, feed pipe 66 will exhaust pressure from the separator basin 62 with limited moisture content. The feed pipe 66 will direct the exhaust from the separator basin 62 to a burner 68. The burner 68 will be used for the combustion of any volatile organic compounds.

Figure 8:
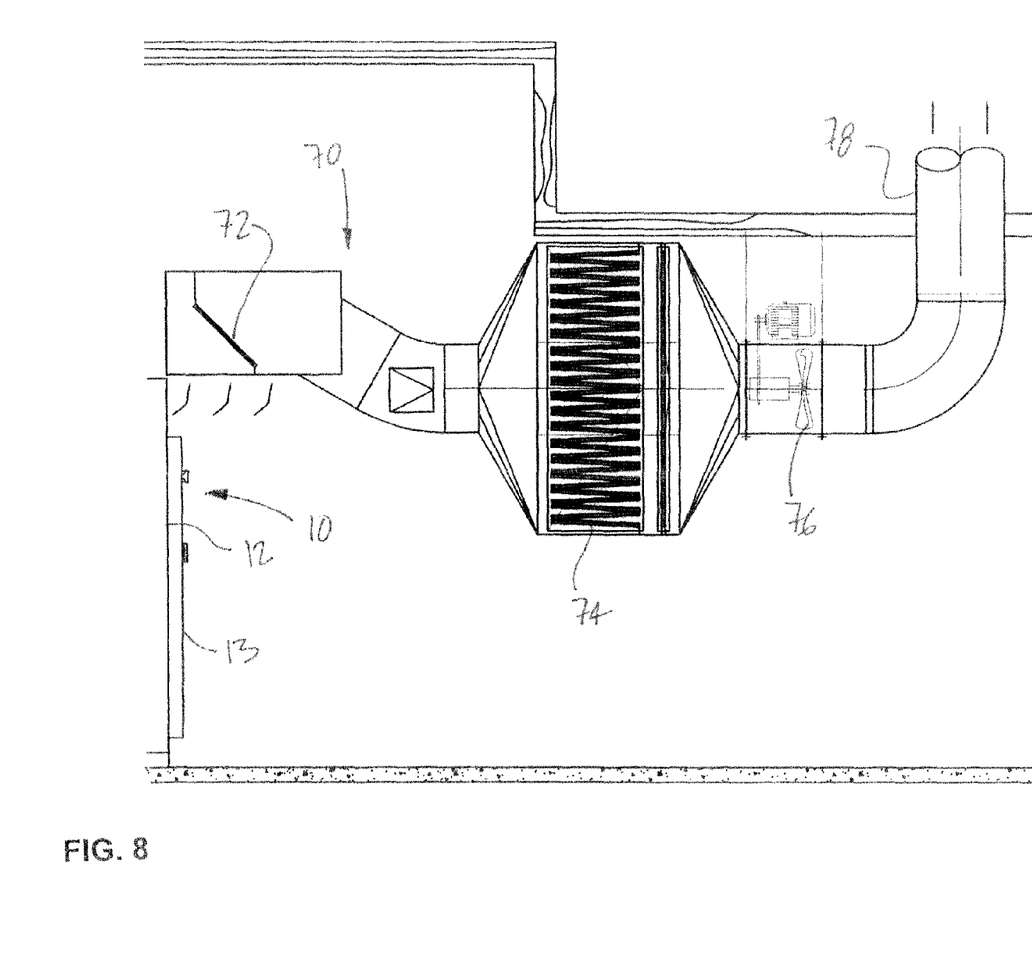
FIG. 8 is a schematic view of an exhaust recuperation unit as used with the apparatus of FIG. 1.

Referring to FIG. 8, an exhaust recuperation unit is generally shown at 70. The exhaust recuperation unit 70 is typically positioned above the door 13 of the apparatus 10, for exhausting odorous gases when the door 13 is opened. The exhaust recuperation unit 70 has appropriate vanes 72 to collect hot air exiting from the casing 12 of the apparatus 10, primarily when the door 13 is opened. A sequence of recuperation coil 74 and fans 76 will create an air flow in the exhaust recuperation unit 70. The recuperation coil 74 encloses a refrigerant that will collect heat from the air circulating in the exhaust recuperation unit 70. Subsequently, the air is exhausted via exhaust pipe 78. The recuperated energy may be used for heating purposes, or to meet any nearby heat demand.

It is pointed out that the exhaust recuperation unit 70 may be positioned at other locations relative to the apparatus 10. Moreover, the apparatus 10 may fully operate without the presence of the exhaust recuperation unit 70.

Figure 9:
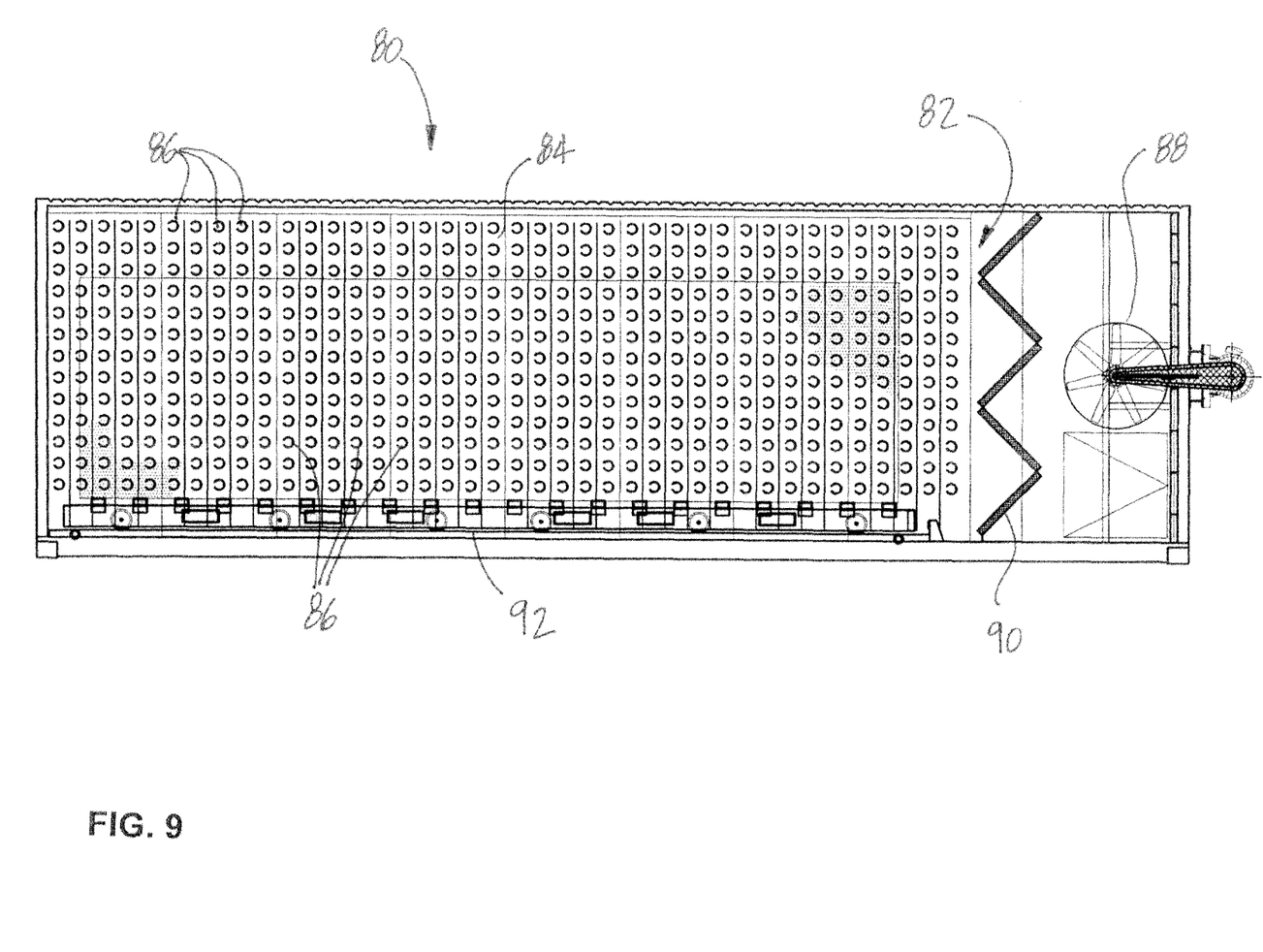
FIG. 9 is a longitudinal sectional view of a cooling apparatus as used with the thermo-transformation apparatus of FIG. 1.

In some instances, it may be required to subject the torrefied wood planks to a cooling treatment. Referring to FIG. 9, there is shown cooling apparatus 80 in which the torrefied wood planks are positioned as a post-treatment step. According to the embodiment, the cooling apparatus 80 is aligned with the apparatus 10 such that the trolley 42 may be transferred in a straight path from the apparatus 10 to the cooling apparatus 80.

The cooling apparatus 80 has a cooling chamber 82 in which the temperature and moisture are controlled. The cooling chamber 82 is defined by perforated walls 84 similar in construction to the perforated walls 14 of the apparatus 10. Accordingly, the perforated walls 84 have throttle disks 86 to control the amount of air reaching the cooling chamber 82. A fan 88 with appropriate filters 90 will inject fresh air into the cooling chamber 82, to cause a cycling of the air within the cooling apparatus 80 to ensure that the wood planks are subjected to relatively uniform cooling parameters. As mentioned previously, rails 92 may be used for the displacement of the trolley in and out of the cooling apparatus 80.

The invention claimed is:

1. An apparatus for thermo-transformation of wood planks, comprising:
    a chamber delimited by a first upright perforated wall, a second upright perforated wall, a top wall and end walls and having a closable entry for receiving wood planks into the chamber;
    a shell surrounding the chamber and spaced therefrom to define a first vertical plenum with the first perforated wall, and a second vertical plenum with the second perforated wall, and a horizontal plenum with the top wall;
    a ventilation system in fluid communication with the plenums to produce a flow of heated air in the plenums; and
    vanes in at least one of the plenums being actuatable to close/open access to the vertical plenums, to allow heated air into at least one of the vertical plenums, through the chamber via the perforated walls, and out from at least the other of the vertical plenums, to return to the ventilation system.

2. The apparatus according to claim 1, wherein a ratio of longitudinal dimension of the perforated walls of the chamber relative to the end walls is grater than 4, whereby the planks are generally lengthwise parallel to the perforated walls.

3. The apparatus according to claim 1, further comprising baffles in the vertical plenums to affect an amount of heated air entering through one of the perforated walls.

4. The apparatus according to claim 1, further comprising a manually-adjustable disk for each opening in the perforated walls, the disks partially blocking an associated opening to affect an amount of heated air entering through each said opening of the perforated walls.

5. The apparatus according to claim 1, further comprising rails on the ground and extending from an exterior of the chamber through the closable entry and into the chamber, and a carriage rollingly mounted on the rails and adapted to support the wood planks.

6. The apparatus according to claim 1, wherein the shell is made of an accordion-like membrane to thermally expand and contract.

7. The apparatus according to claim 6, further comprising a rigid casing accommodating the shell, the shell having flanges longitudinally distributed thereon, the flanges being pivotally mounted to the rigid casing for pivoting motion when thermally expanding and contracting.

8. The apparatus according to claim 7, further comprising ribs between the flanges, the ribs limiting an expansion of the shell.

9. The apparatus according to claim 1, wherein the perforated walls extend in a longitudinal dimension of the chamber, with lateral walls extending in the plenums to separate the plenums in a first and a second plenum sections in a plane normal to the longitudinal dimension, the vanes being controlled to allow entry of heated air into the first vertical plenum of the first plenum section, and out through the second vertical plenum of the second plenum section in a first cycle.

10. The apparatus according to claim 9, further comprising means to control the vanes to allow entry of heated air into the second vertical plenum of the first plenum section, and out through the first vertical plenum of the second plenum section in a second cycle, the means reversing the cycles.

11. The apparatus according to claim 9, wherein an outlet of the ventilation system is in the first plenum section, and an outlet of the ventilation is in the second plenum section.

12. The apparatus according to claim 1, wherein an inlet and an outlet of the ventilation system are in fluid communication with the horizontal plenum.

13. The apparatus according to claim 1, further comprising a rigid casing accommodating the shell, and an exhaust pipe in fluid communication with an interior of the casing to selectively exhaust heated air.

14. A method for performing a thermo-transformation treatment on wood planks in a thermo-transformation chamber, comprising:
    heating air and directing the heated air to a first vertical plenum separated from the thermo-transformation chamber by a first perforated wall that is substantially vertical;
    directing the heated air from the first vertical plenum transversely through a bundle of spaced-apart planks oriented lengthwise into the thermo-transformation chamber, by way of the first perforated wall extending at least from a bottom to a top of the bundle;
    collecting the heated air in a second vertical plenum and directing the collected air to be reheated; and
    reversing a direction of the heated air through the bundle of spaced-apart planks by directing the heated air to the second vertical plenum, directing the heated air from the second vertical plenum transversely through the bundle of spaced-apart planks by way of a second perforated wall, and collecting the heated air in the first vertical plenum and directing the collected air to be reheated.

15. The method according to claim 14, further comprising reversing the directions automatically as a function of a given periods of time.

16. The method according to claim 14, wherein directing the heated air from the first vertical plenum transversely through a bundle of spaced-apart planks comprises deflecting some of the heated air with baffles.

17. The method according to claim 14, wherein directing heated air to a first vertical plenum comprises directing the heated air to a first plenum section along a longitudinal dimension of the vertical plenums, and collecting the heated air comprises collecting the heated air in a second plenum section along the longitudinal dimension of the vertical plenums.

18. The method according to claim 17, wherein reversing a direction of the heated air through the bundle of spaced-apart planks comprises directing the heated air to the second vertical plenum in the first plenum section, directing the heated air from the second vertical plenum transversely through the bundle of spaced-apart planks by way of a second perforated wall, and collecting the heated air in the first vertical plenum of the second plenum section and directing the collected air to be reheated.

19. The method according to claim 18, further comprising reversing the directions automatically as a function of a given periods of time.

* * * * *